United States Patent Office 3,213,117
Patented Oct. 19, 1965

3,213,117
PROCESS FOR PREPARATION OF $\Delta^{1(10)}$-5α-ESTREN-17β-OL-2-ONE AND DERIVATIVES THEREOF
Alexander D. Cross, Mexico City, Mexico, assignor to Syntex Corporation, Panama, Panama, a corporation of Panama
No Drawing. Filed Dec. 23, 1963, Ser. No. 332,961
Claims priority, application Mexico, July 3, 1963, 72,864
3 Claims. (Cl. 260—397.4)

The present invention relates to novel cyclopentanophenanthrene derivatives and to a process for the preparation thereof.

More particularly the present invention relates to a novel process for the prepartion of $\Delta^{1(10)}$-5α-estren-17β-ol-2-one, to novel 17α-lower alkyl and 17α-lower alkenyl and alkinyl-$\Delta^{1(10)}$-5α-estren-17β-ol-2-one derivatives and to a process for the production thereof.

The novel compounds of the present invention are represented by the following formulae:

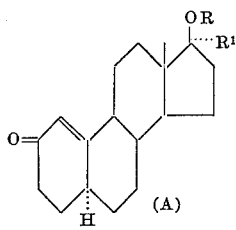
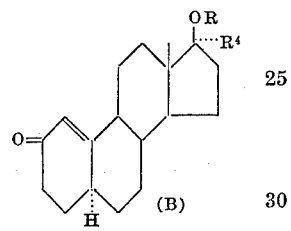

In the above formulae R represents hydrogen or a hydrocarbon carboxylic acyl radical of less than 12 carbon atoms; $R^1$ represents a lower alkyl group; and $R^4$ represents a lower alkenyl or alkinyl group.

The acyl group is derived from hydrocarbon carboxylic acids containing less than 12 carbon atoms which may be saturated or unsaturated, of straight, branched, cyclic or cyclic-aliphatic chain or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopenylpropionate, aminoacetate, and β-chloropropionate.

The compounds represented by formula A are anabolic-androgenic agents with a favorable anabolic-androgenic ratio. In addition they are anti-estrogenic and anti-gonadotrophic agents and lower the blood and adrenal cholesterol levels.

The compounds represented by formula B are progestational agents with oral activity and are useful in fertility control.

The compounds represented by Formulae A and B and $\Delta^{1(10)}$-5α-estren-17β-ol-2-one are valuable intermediates in the production of various 10-substituted estrane derivatives such as 10-cyano, 10-ethinyl, 10-acetonyl, 10-dicarbethoxymethyl or 10-cyanoethyl estrane 2-one derivatives which are androgenic-anabolic agents. The conversion of the $\Delta^{1(10)}$-2-keto compounds of the present invention into the latter estrane derivatives is carried out in accordance with my copending U.S. patent application Serial No. 332,964 filed of even date, by treatment with potassium cyanide in ethanol, with diethyl malonate in the presence of sodium methoxide, with lithium acetylide, with dimethyl ketone in the presence of piperidine or with acrylonitrile in the presence of Triton B to give respectively the corresponding 10-cyano, 10-dicarbethoxymethyl, 10-ethinyl, 10-acetonyl or 10(β-cyanoethyl) derivatives.

The novel process for the production of $\Delta^{1(10)}$-5α-estren-17β-ol-2-one is illustrated by the following equation:

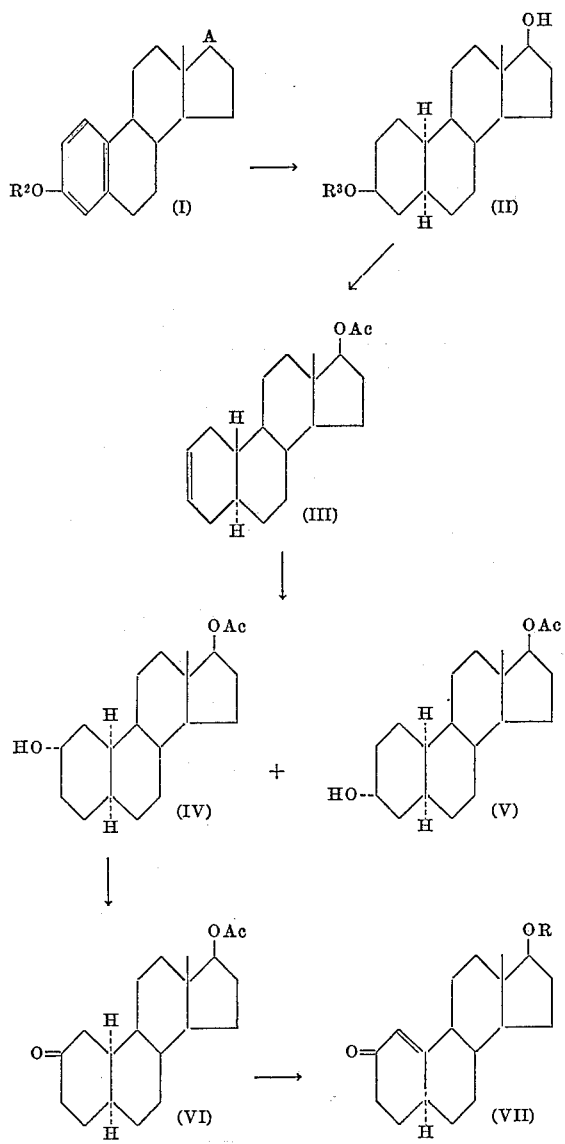

In the above formulae $R^2$ represents hydrogen, a lower alkyl group or a hydrocarbon carboxylic group of less than 12 carbon atoms; A represents a β-hydroxyl group, a β-hydrocarbon carboxylic group of less than 12 carbon atoms or a keto group; $R^3$ is hydrogen or a lower alkyl group; Ac is an acyl radical, preferably the acetyl radical; and R has the same meaning as previously set forth.

In carrying out the process just outlined, the starting compound (I) which may be estradiol, estrone, or any of the corresponding 3-lower alkyl ethers, 3-lower alkyl-ethers-17-esters, 3,17-diesters, 3-monoesters or 17-monoesters of estradiol, or 3-lower alkyl ethers or 3-esters of estrone, is hydrogenated in the presence of a catalyst, preferably ruthenium dioxide in ethanol solution and under a pressure varying between 80 and 200 atmospheres, preferably at a temperature comprised between room temperature and 150° C. to produce 5α,10α-estrane-3β, 17β-diol or the corresponding 3-lower alkyl ether (II). Any of these compounds, upon selective dehydration at C-3, preferably by treatment with a lower alkanoic anhydride, e.g., acetic anhydride and a Lewis acid such as boron trifluoride etherate in the presence of an alkali metal halide such as lithium bromide and preferably at steam bath temperature gives the acetate of 5α,10α-Δ²-estren-17β-ol (III). Upon reaction of this compound with diborane in a suitable solvent such as tetrahydrofuran, followed by treatment of the organo-boron compound thus formed with hydrogen peroxide, at a temperature of around 15–50° C., there is produced a mixture of 5α,10α-estrane-2α,17β-diol-17-acetate and 5α,10α-estrane-3α,17β-diol-17-acetate (V). These compounds may be easily separated by column chromatography or fractional crystallization. 5α,10α-estrane-2α,17β - diol - 17 - acetate (IV) upon oxidation by conventional methods, such as for example by treatment with chromium trioxide preferably in an 8 N solution in acetone-sulfuric acid, at a temperature of around 0–5° C. produces the acetate of 5α,10α-estran-17β-ol-2-one (VI). Upon introduction of a double bond into the latter compound between C–1 and C–10, preferably by reaction of said saturated ketone (VI) with approximately 1 molar equivalent of bromine in acetic acid and in the presence of hydrobromic acid and subsequent dehydrohalogenation of the 1-bromo-2-keto-steroid compound thus obtained, preferably by heating under reflux in a nitrogen containing organic solvent such as dimethylformamide, and preferably with calcium carbonate, there is produced $\Delta^{1(10)}$-5α-estren-17β-ol-2-one acetate (VII; R=acetyl). Upon conventional hydrolysis of the ester group of the latter compound (VII) in an alkaline medium, preferably potassium hydroxide in a polar organic solvent such as methanol, there is obtained $\Delta^{1(10)}$-5α-estren-17β-ol-2-one (VII; R=H).

The novel 17α-substituted compounds of the present invention are prepared by the process exemplified as follows:

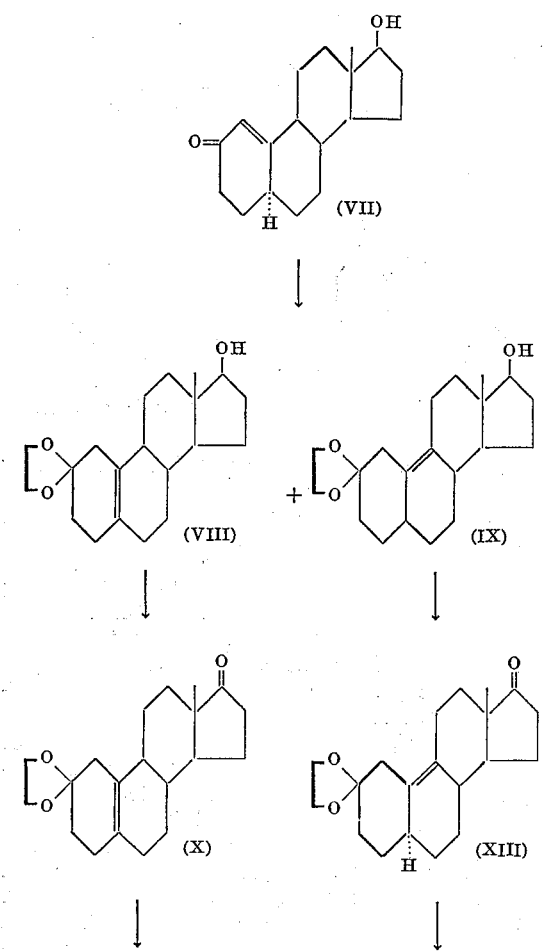

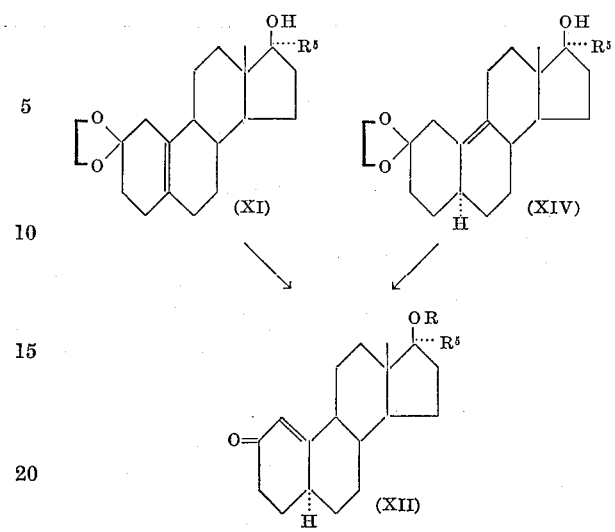

In the above formula $R^5$ represents lower alkyl, lower alkenyl or lower alkinyl and R has the same meaning as set forth hereinbefore.

In practicing the process just outlined, $\Delta^{1(10)}$-5α-estren-17β-ol-2-one (VII) is treated conventionally with ethyleneglycol in an aromatic solvent such as benzene and in the presence of p-toluenesulfonic acid at a reflux temperature for a period of time that may vary between 3 and 18 hours thus producing a mixture of 2-cycloethylenedioxy-$\Delta^{5(10)}$-estren-17β-ol (VIII) and 2-cycloethylenedioxy-$\Delta^{9(10)}$-5α-estren-17β-ol (IX), which are separated conventionally by chromatography of fractional crystallization.

The hydroxyl group at C–17β of 2-cycloethylenedioxy-$\Delta^{5(10)}$-estren-17β-ol (VIII) is oxidized preferably by treatment with chromic anhydride in pyridine solution to give 2-cycloethylenedioxy-$\Delta^{5(10)}$-estren - 17 - one (X). Treatment of this compound with a (lower alkyl, alkenyl or alkinyl) magnesium halide, such as methyl, vinyl or ethinyl magnesium bromide in a solvent inert to the reagent, such as benzene produces the corresponding 2-cycloethylenedioxy-17α-lower (alkyl, alkenyl or alkinyl)-$\Delta^{5(10)}$-estren-17β-ol derivatives (XI). The 2-cycloethylenedioxy grouping of the latter compounds is conventionally hydrolyzed in an acid medium to give the corresponding 17α-lower (alkyl, alkenyl or alkinyl)-$\Delta^{1(10)}$-5α-estren-17β-ol-2-one derivatives (XII; R=hydrogen).

Alternatively, the latter compounds may be obtained from 2-cycloethylenedioxy-$\Delta^{9(10)}$-5α-estren-17β-ol following the same sequence of reactions described for the corresponding $\Delta^{5(10)}$-isomer and there are thus successively produced: 2-cycloethylenedioxy-$\Delta^{9(10)}$-5α-estren - 17 - one (XIII), the corresponding 2-cycloethylenedioxy-17α-lower (alkyl, alkenyl or alkinyl) - $\Delta^{9(10)}$ - 5α - estren - 17β - ol (XIV) and finally the corresponding 17α-lower (alkyl, alkenyl or alkinyl)-$\Delta^{1(10)}$-5α-estren-17β-ol-2-one (XII; R=H).

The compounds of the present invention having in the molecule a tertiary hydroxyl group, e.g. (XII; R=H) at C–17 are conventionally acylated in the presence of p-toluenesulfonic acid with a suitable acylating agent such as an anhydride derived from a hydrocarbon carboxylic acid of the type described above, thus giving the corresponding acylates (XII; R=acyl).

The following specific examples serve to illustrate the present invention but are not intended to limit it:

*Example 1*

A solution of 50 g. of the 3-methyl ether of estradiol in 700 cc. of ethanol was hydrogenated firstly in the presence of 1.2 grams of ruthenium dioxide catalyst (RuO₂) under a pressure of 1,600 p.s.i. and at room temperature; then the mixture was heated to 125° C. The hydrogenation was continued during 7 hours more. The mixture was cooled, the catalyst filtered off and the filtrate evaporated to dryness. By chromatography of the residue through a neutral alumina column and recrystallization of the solid fractions eluted with benzene ether (60:40) there was obtained the 3-methyl ether of 5α,10α-estrane-3β,17β-diol (Cpd. No. 1).

The starting compounds listed under I were treated by the same procedure to produce the corresponding products under II.

| I | Cpd. No. | II |
|---|---|---|
| Estradiol | 2 | 5α, 10α-estrane-3β, 17β-diol. |
| 3-methylether-17-acetate of estradiol. | 1 | 3-methylether of 5α, 10α-estrane-3β, 17β-diol. |
| 3-acetate of estradiol | 2 | 5α, 10α-estrane-3β, 17β-diol. |
| 3-benzoate-17-propionate of estradiol. | 2 | Do. |
| 3, 17-diacetate of estradiol | 2 | Do. |
| 17-acetate of estradiol | 2 | Do. |
| 3-methylether of estrone | 1 | 3-methylether of 5α, 10α-estrane-3β, 17β-diol. |
| Estrone | 2 | 5α, 10α-estrane-3β, 17β-diol. |
| 3-acetate of estrone | 2 | Do. |
| 3-propionate of estrone | 2 | Do. |

Example II

A mixture of 10 g. of the 3-methylether of 5α,10α-estrane-3β,17β-diol (Cpd. No. 1), 50 g. of anhydrous lithium bromide, 250 cc. of freshly distilled acetic anhydride and 6 cc. of boron trifluoride etherate, also freshly distilled, was heated in a steam bath for 2 hours. The mixture was poured into ice water and was stirred until the excess of anhydride was hydrolyzed, then extracted several times with ethyl acetate in portions of 500 cc. of each. The combined organic extracts were washed with sodium bicarbonate solution and then with water until neutral. The organic solution was dried over sodium sulfate and evaporated to dryness, the product was crystallized from methanol to give the acetate of 5α,10α-Δ²-estren-17β-ol (Cpd. No. 3).

Following exactly the same technique except that the 3-methyl ether of 5α,10α-estrane-3β,17β-diol (Cpd. No. 1), was substituted by 5α,10α-estrane-3β,17β-diol (Cpd. No. 2), there was produced the acetate of 5α,10α-Δ²-estren-17β-ol (Cpd. No. 3).

Example III

A slow stream of diborane was poured through a solution of 10 g. of the acetate of 5α,10α-Δ²-estren-17β-ol (Cpd. No. 3) in 125 cc. of tetrahydrofuran for 1 hour. (After 20 minutes the solution became warm and then the temperature slowly subsided.) The excess of diborane was decomposed by careful addition of water. Then 1 lt. of water was added and the formed precipitate was filtered, washed and dried, thus giving 9.6 g. of the organoboron compound.

This material was dissolved in 200 cc. of tetrahydrofuran and treated with 9 g. of sodium hydroxide previously dissolved in 25 cc. of water, and 45 cc. of 35% hydrogen peroxide, stirring and keeping the temperature around 15° C. The mixture was stirred for 2 hours, after this time, the precipitated product was filtered, washed and dried. The total crude product was chromatographed on a 300 g. neutral alumina column; the eluates obtained with a mixture of benzene-hexane (80:20) produced the 17-acetate of 5α,10α-estrane-3α,17β-diol (Cpd. No. 4), and from the fractions eluted with benzene-ether (80:20), there was obtained the 17-acetate of 5α,10α-estrane-2α,17β-diol (Cpd. No. 5), the latter predominating in the isomers mixture.

Example IV

A solution of 1 g. of the 17-acetate of 5α,10α-estrane-2α,17β-diol (Cpd. No. 5) in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave the acetate of 5α,10α-estran-17β-ol-2-one (Cpd. No. 6).

Example V

A solution of 5 g. of the foregoing compound (Cpd. No. 6) in 100 cc. of acetic acid was treated with a few drops of hydrogen bromide in acetic acid and subsequently dropwise and with stirring, with a solution of 1.1 molar equivalents of bromine in 50 cc. of acetic acid. After all the bromine had been consumed, water was added, the formed precipitate filtered, washed with water to neutral and dried under vacuum. Recrystallization from acetone-hexane yielded the acetate of 1-bromo-5α,10α-estran-17β-ol-2-one (Cpd. No. 7).

2 g. of the preceding 1-bromo-2-keto steroid compound in 40 cc. of cold dimethylformamide was added over 15 minutes to a suspension of 5 g. of finely divided calcium carbonate in 15 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded the acetate of Δ¹⁽¹⁰⁾-5α-estren-17β-ol-2-one (Cpd. No. 28).

2 g. of above steroid acetate were dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing Δ¹⁽¹⁰⁾-5α-estren-17β-ol-2-one (Cpd. No. 9).

Example VI

A mixture of 1 g. of the preceding steroidal hydroxy compound (Cpd. No. 9), 4 cc. of pyridine and 2 cc. of propionic anhydride was kept at room temperature overnight, poured into ice water, the formed precipitate was filtered, washed with water and dried. Crystallization from acetone-hexane gave the propionate of Δ¹⁽¹⁰⁾-5α-estren-17β-ol-2-one.

The above technique was followed, except that propionic anhydride was substituted by caproic anhydride, enanthic anhydride, undecenoic anhydride and cyclopentylpropionic anhydride to produce the corresponding caproate (Cpd. No. 10), enanthate (Cpd. No. 11), undecenoate (Cpd. No. 12) and cyclopentylpropionate (Cpd. No. 13) of Δ¹⁽¹⁰⁾-5α-estren-17β-ol-2-one.

Example VII

A solution of 2 g. of compound No. 9 in 8 cc. of pyridine was treated with 4 cc. of benzoyl chloride and then heated on the steam bath for 1 hour. The mixture was then poured into ice water and the formed precipitate collected, washed with water and dried. Recrystallization from methylene chloride-hexane afforded the benzoate of Δ¹⁽¹⁰⁾-5α-estren-17β-ol-2-one (Cpd. No. 14).

Example VIII

A mixture of 5 g. of Δ¹⁽¹⁰⁾-5α-estren-17β-ol-2-one (Cpd. No. 9), 125 cc. of dry benzene, 25 cc. of ethylene glycol and 250 mg. of p-toluenesulfonic acid monohydrate was refluxed for 16 hours using a water separator. It was then washed with a sodium bicarbonate solution, water and subsequently dried and evaporated to dryness. The foregoing crude residue was dissolved in a mixture of benzene-hexane (1:1) and was passed through a 200 g. neutral alumina column; the fractions eluted with benzene-hexane (2:1) produced 2-cycloethylenedioxy-$\Delta^{5(10)}$-estren-17β-ol (Cpd. No. 15) and the eluates obtained with benzene-hexane (4:1) gave 2-cycloethylenedioxy-$\Delta^{9(10)}$-5α-estren-17β-ol (Cpd. No. 16).

*Example IX*

A solution of 6 g. of 2-cycloethylenedioxy-$\Delta^{5(10)}$-estren-17β-ol (Cpd. No. 15) in 120 cc. of pyridine was added to a mixture of 6 g. of chromic trioxide in 120 cc. of pyridine. The reaction mixture was kept at room temperature overnight. It was then diluted with ethyl acetate, filtered though celite and the filtrate washed well with water, dried and evaporated to dryness. Crystallization from acetone-hexane afforded 2-cycloethylenedioxy-$\Delta^{5(10)}$-estren-17-one (Cpd. No. 17).

Following exactly the same procedure, except that 2-cycloethylenedioxy-$\Delta^{9(10)}$-5α-estren-17β-ol was the compound treated, there was obtained 2-cycloethylenedioxy-$\Delta^{9(10)}$-5α-estren-17-one (Cpd. No. 18).

*Example X*

A solution of 5 g. of 2-cycloethylenedioxy-$\Delta^{5(10)}$-estren-17-one (obtained according to Example IX) in 250 cc. of thiophene-free benzene was treated with 27.5 cc. of 4 N methylmagnesium bromide in ether with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene-chloride-hexane afforded 2-cycloethylenedioxy-17α-methyl-$\Delta^{5(10)}$-estren-17β-ol (Cpd. No. 19), 2-cycloethylenedioxy-$\Delta^{9(10)}$-5α-estren-17-one (Cpd. No. 18) was treated according to the above technique, thus being obtained 2-cycloethylenedioxy-17α-methyl-$\Delta^{9(10)}$-5α-estren-17β-ol (Cpd. No. 20).

*Example XI*

2-cycloethylenedioxy-$\Delta^{5(10)}$-estren-17-one (Cpd. No. 17) and 2-cycloethylenedioxy-$\Delta^{9(10)}$-5α-estren-17-one (Cpd. No. 18) were treated according to the procedure described in Example X, except that methyl magnesium bromide was substituted by vinyl magnesium bromide and by ethinyl magnesium bromide, and there were produced the compounds hereinafter set forth:

Cpd. No.:
21. 2-cycloethylenedioxy-17α-vinyl-$\Delta^{5(10)}$-estren-17β-ol
22. 2-cycloethylenedioxy-17α-ethinyl-$\Delta^{5(10)}$-estren-17β-ol
23. 2-cycloethylenedioxy-17α-vinyl-$\Delta^{9(10)}$-5α-estren-17β-ol
24. 2-cycloethylenedioxy-17α-ethinyl-$\Delta^{9(10)}$-5α-estren-17β-ol

*Example XII*

A solution of 500 mg. of 2-cycloethylenedioxy-17α-methyl-$\Delta^{5(10)}$-estren-17β-ol (Cpd. No. 19) in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 17α-methyl-$\Delta^{1(10)}$-5α-estren-17β-ol-2-one (Cpd. No. 25).

Following the above technique, there were treated the starting compounds listed under I, to produce the corresponding products set forth under II.

| I | Cpd. No. | II |
|---|---|---|
| 2-cycloethylenedioxy-17α-methyl-$\Delta^{9(10)}$-5α-estren-17β-ol. | 25 | 17α-methyl-$\Delta^{1(10)}$-5α-estren-17β-ol-2-one. |
| 2-cycloethylenedioxy-17α-vinyl-$\Delta^{5(10)}$-estren-17β-ol. | 26 | 17α-vinyl-$\Delta^{1(10)}$-5α-estren-17β-ol-2-one. |
| 2-cycloethylenedioxy-17α-vinyl-$\Delta^{9(10)}$-5α-estren-17β-ol. | 26 | Do. |
| 2-cycloethylenedioxy-17α-ethinyl-$\Delta^{5(10)}$-estren-17β-ol. | 27 | 17α-ethinyl-$\Delta^{1(10)}$-5α-estren-17β-ol-2-one. |
| 2-cycloethylenedioxy-17α-ethinyl-$\Delta^{9(10)}$-5α-estren-17β-ol. | 27 | Do. |

*Example XIII*

To a solution of 5 g. of 17α-methyl-$\Delta^{1(10)}$-5α-estren-17β-ol-2-one (obtained according to the method of Example XII) in 100 cc. of anhydrous benzene there were added 1 g. of p-toluenesulfonic acid was 10 cc. of acetic anhydride and the mixture was allowed to stand for 24 hours at room temperature, poured into ice and water, and the resulting mixture stirred to effect hydrolysis of the excess anhyride. The benzene layer was separated and washed with 10% sodium carbonate solution and water. Drying, evaporation and crystallization of the residue from ether-hexane produced the acetate of 17α-methyl-$\Delta^{1(10)}$-5α-estren-17β-ol-2-one (Cpd. No. 27).

The starting compounds listed below were treated by the above technique with the indicated anhydride to produce the corresponding products set forth hereinafter:

| Starting compounds | Anhydrides | Products |
|---|---|---|
| 17α-methyl-$\Delta^{1(10)}$-5α-estren-17β-ol-2-one. | Propionic | Propionate of 17α-methyl-$\Delta^{1(10)}$-5α-estren-17β-ol-2-one. |
| Do | Caproic | Caproate of 17α-methyl-$\Delta^{1(10)}$-5α-estren-17β-ol-2-one. |
| Do | Cyclopentylpropionic | Cyclopentylpropionate of 17α-methyl-$\Delta^{1(10)}$-5α-estren-17β-ol-2-one. |
| 17α-vinyl-$\Delta^{1(10)}$-5α-estren-17β-ol-2-one. | Acetic | Acetate of 17α-vinyl-$\Delta^{1(10)}$-5α-estren-17β-ol-2-one. |
| Do | Propionic | Propionate of 17α-vinyl-$\Delta^{1(10)}$-5α-estren-17β-ol-2-one. |
| Do | Caproic | Caproate of 17α-vinyl-$\Delta^{1(10)}$-5α-estren-17β-ol-2-one. |
| Do | Cyclopentylpropionic | Cyclopentylpropionate of 17α-vinyl-$\Delta^{1(10)}$-5α-estren-17β-ol-2-one. |
| 17α-ethinyl-$\Delta^{1(10)}$-5α-estren-17β-ol-2-one. | Acetic | Acetate of 17α-ethinyl-$\Delta^{1(10)}$-5α-estren-17β-ol-2-one. |
| Do | Propionic | Propionate of 17α-ethinyl-$\Delta^{1(10)}$-5α-estren-17β-ol-2-one. |
| Do | Caproic | Caproate of 17α-ethinyl-$\Delta^{1(10)}$-5α-estren-17β-ol-2-one. |
| Do | Cyclopentylpropionic | Cyclopentylpropionate of 17α-ethinyl-$\Delta^{1(10)}$-5α-estren-17β ol-2-one. |

I claim:

1. In the process for the production of $\Delta^{1(10)}$-5α-estren-17β-ol-2-one the step which comprises treating a compound selected from the group consisting of 5α,10α-estrane-3β,17β-diol and a 3-lower alkyl ether thereof, with a lower alkanoic anhydride and a Lewis acid in the presence of an alkali metal halide to produce the corresponding 5α,10α-$\Delta^2$-estren-17β-ol acylate.

2. The process step of claim 1 wherein the lower alkanoic anhydride is acetic anhydride, the Lewis acid is boron trifluoride etherate and the alkali metal halide is lithium bromide.

3. A process for the production of $\Delta^{1(10)}$-5α-estren-17β-ol-2-one which comprises treating the acetate of 5α,10α-$\Delta^2$-estren-17β-ol with diborane followed by hydrogen peroxide, separating the obtained mixture by alumina chromatography, oxidizing the produced 5α,10α-estrane-2α,-

17β-diol 17-acetate with chromium trioxide, treating the resulting 5α,10α-estran-17β-ol-2-one 17-acetate with approximately 1 molar equivalent of bromine in the presence of hydrogen bromide, dehydrohalogenating the 1-bromo-2-keto steroid thus produced by heating under reflux with a nitrogen containing organic solvent, and hydrolyzing the obtained $\Delta^{1(10)}$-5α-estren-17β-ol-2-one acetate in an alkaline medium.

References Cited by the Examiner

Applezweig: Steroid Drugs, 1962 Ed., pages 498, 500, 510, 511, 521, 522, 524 and 525, McGraw-Hill Book Company, New York.

Fishman et al.: J. Org. Chem. 27, pages 365–68 (1962).

LEWIS GOTTS, *Primary Examiner.*